La F. BINGHAM.
Apparatus for Generating and Carbureting Hydrogen Gas.
No. 154,009. Patented Aug. 11, 1874.
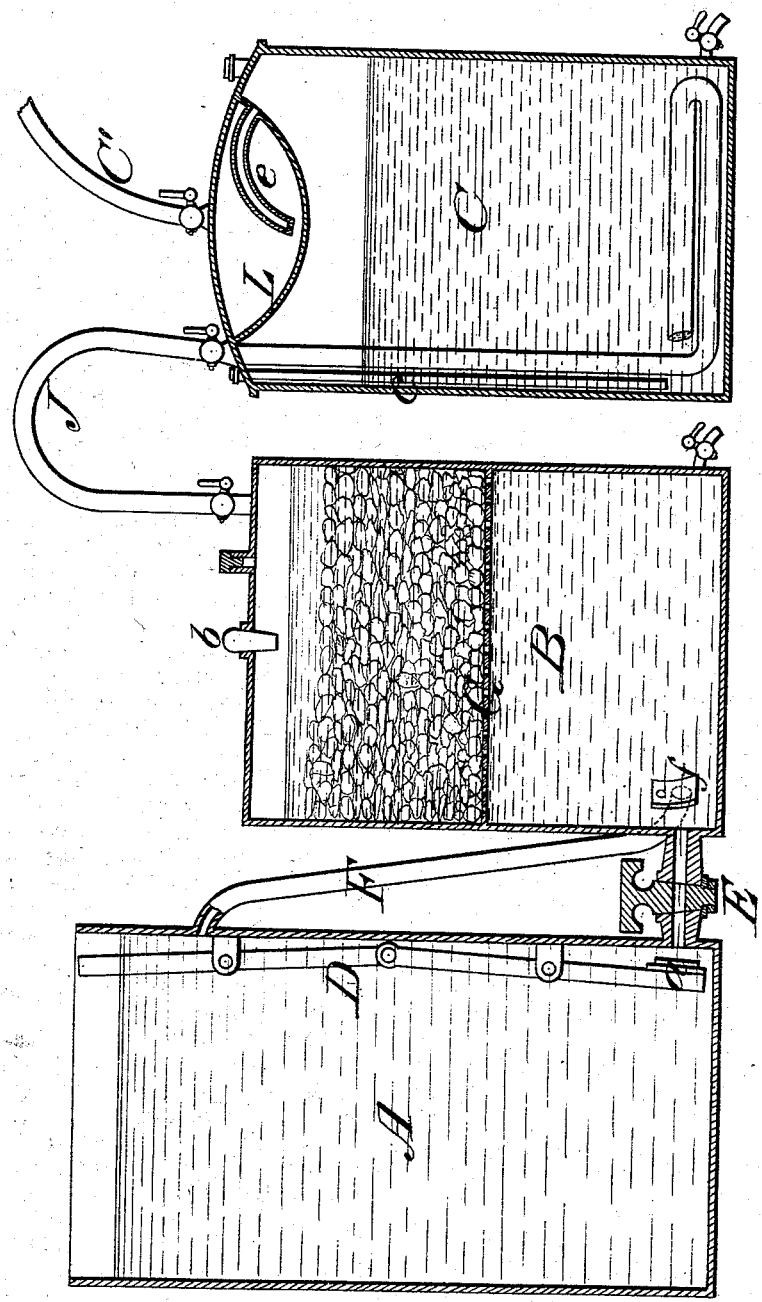

UNITED STATES PATENT OFFICE.

LA FAYETTE BINGHAM, OF NEW YORK, N. Y.

IMPROVEMENT IN APPARATUS FOR GENERATING AND CARBURETING HYDROGEN-GAS.

Specification forming part of Letters Patent No. 154,009, dated August 11, 1874; application filed July 6, 1874.

Be it known that I, LA FAYETTE BINGHAM, of New York, in the county of New York and State of New York, have invented a new and valuable Improvement in Hydrocarbon-Gas Machine; and I do hereby declare that the following is a full, clear, and exact description of the construction and operation of the same, reference being had to the annexed drawings making a part of this specification, and to the letters and figures of reference marked thereon.

The figure of the drawing is a representation of a sectional view of my hydrocarbon-gas machine.

This invention relates to certain novel improvements on the apparatus for making illuminating-gas, for which Letters Patent of the United States were granted to me on the 2d day of June, 1874.

In the schedule annexed to said Letters Patent I described a hydrogen-gas generator wherein the inverted vessel containing the iron was inclosed within the vessel containing the acidulated water. Such an arrangement renders it very difficult to obtain access to the inner vessel, and also renders the apparatus expensive, owing in part to the necessity of using non-corrodible hoops for the inner vessel.

The object of my present invention is mainly to so contrive the apparatus for generating hydrogen-gas that the acid-vessel and the vessel containing the iron turnings shall be separate, thus allowing free access to them outside as well as inside, and enabling me to construct them of wood bound with iron hoops. Another object of my invention is to automatically transfer the acidulated water from the upper part of the acid-vessel into the vessel containing the iron turnings; also, to provide in the upper end of the carbureter a purifying or charcoal receptacle with a siphon-shaped pipe leading into it and the service-pipe leading out of it, as will be hereinafter more fully explained.

In the annexed drawings, A designates a vessel of suitable capacity, which is the reservoir for the acidulated water. B designates a vessel, in which hydrogen-gas is generated by the action of an acid on iron turnings; and C is the carbureter. Inside of the vessel A is a compound lever, D, on the lower end of which a valve, $a$, is applied for closing the bore of a cock, E, which cock forms a communication between the two vessels A and B. F designates a pipe, which leads out of the vessel A near its upper end, and communicates with the vessel B near the lower end thereof, where a valve, $f$, is provided, opening into vessel B. G designates a grating in vessel B for supporting the iron turnings therein; and $b$ is a plug, which closes an opening, through which access is had to the interior of vessel B. J is a pipe, which conducts hydrogen-gas from vessel B into the vessel C at its bottom, so that the gas will rise through the body of the carbon-oil, and thus be carbureted. L designates a receptacle for charcoal or other substance which will purify the gas; and $e$ is a siphon-shaped pipe, which leads into the receptable L and conducts the carbureted gas into the center of the body of charcoal. After the gas is purified it is conducted off to be burned through the pipe C'.

When the gas exerts a given pressure in the vessel B it will shut the valve $f$ and open valve $a$, and when the pressure is relieved valve $f$ will open and allow fresh acidulated water to flow into the vessel B through the pipe F.

What I claim as new, and desire to secure by Letters Patent, is—

1. The reservoir A, separate from the generator B, and connected thereto by means of a cock, E, substantially as described.

2. In combination with the vessels A B, separated as described, the transfer-pipe F with its valve $f$ and the cock E, provided with a valve, $a$, substantially as specified.

3. The charcoal-receptacle L in carbureter C, provided with a siphon-shaped pipe, $e$, substantially as specified.

In testimony that I claim the above I have hereunto subscribed my name in the presence of two witnesses.

LA FAYETTE BINGHAM.

Witnesses:
GEORGE E. UPHAM,
H. C. HOLLINGSHEAD.